Patented Aug. 18, 1942

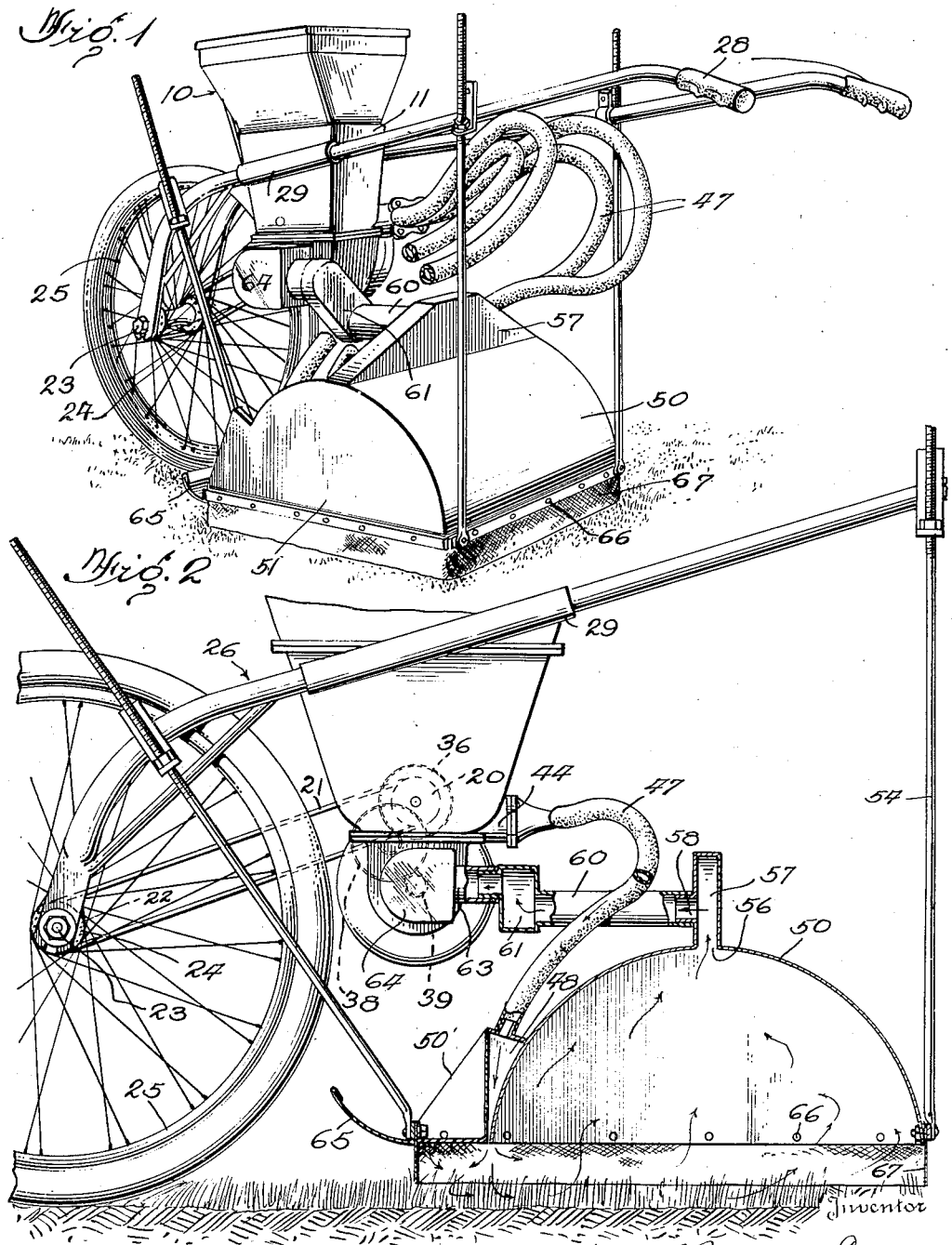

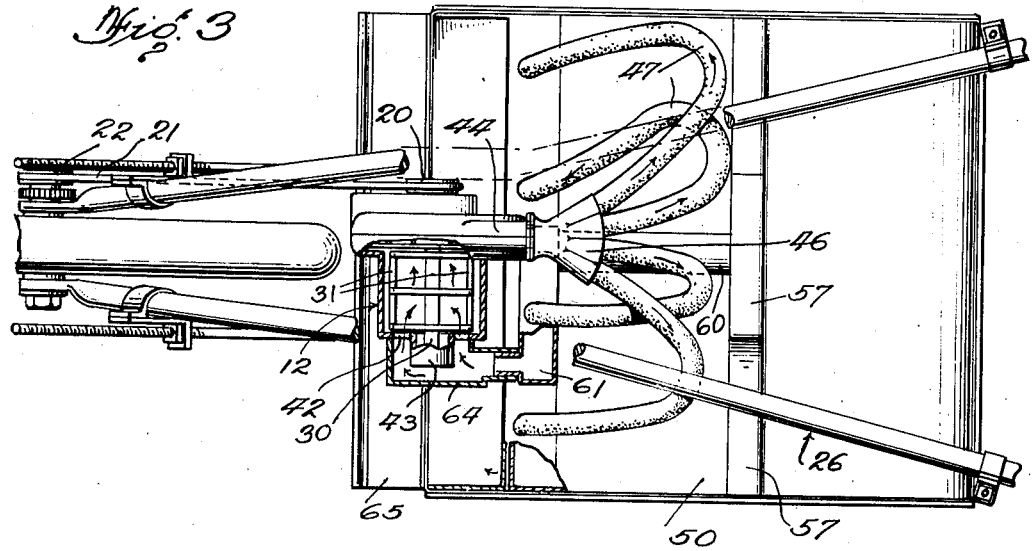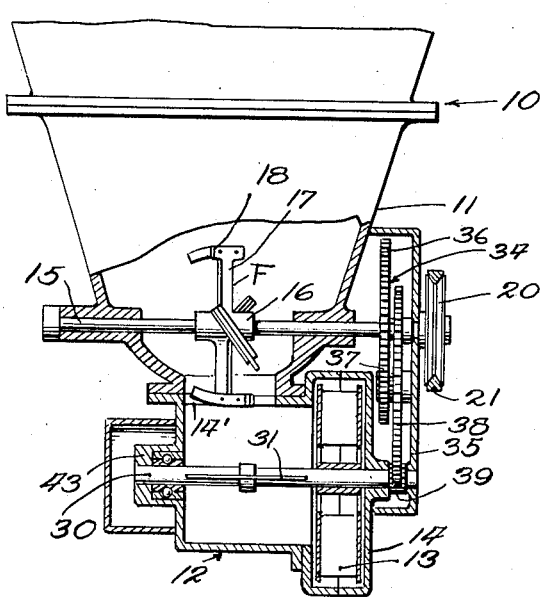

2,293,517

UNITED STATES PATENT OFFICE 2,293,517

APPARATUS FOR DUSTING PLANTS

George S. Messinger and Clyde U. Messinger, Tatamy, Pa., assignors to Messinger Manufacturing Company, Tatamy, Pa., a corporation of Pennsylvania Application July 3, 1940, Serial No. 343,868

1 Claim. (Cl. 43—148)

This invention relates to dusting apparatus, that is, to apparatus for applying insecticide or fungicide dust or powders to vegetation for the purpose of killing existing insect pests or rendering the vegetation so treated resistant to the attack of such pests.

Various types of apparatus particularly designed and constructed for the purpose of "dusting" lawns, growing crops, trees, bushes, and other vegetation, have heretofore been suggested and there are now on the market machines of this type which are highly useful. A machine which has proven eminently successful in actual use, for the purpose of dusting plants and the like with insecticide and fungicide powders is disclosed and claimed in Patent 1,716,970, granted June 11, 1929 to G. S. Messinger. In the patent referred to a wholly novel method of dusting or dry spraying vegetation with insecticide powders is disclosed, the method including the steps of mixing powder with air in a mixing chamber, drawing the mixed air and powder into a blower and forcibly discharging it from the blower upon a plant or tree, at high velocity. The dust-laden air which is actually discharged may be projected from substantial distances from the machine and no means is provided for preventing the discharged dust, or at least that portion thereof which does not come into immediate contact with foliage or other article to be dusted, from being blown away. Even in still or quiescent air a certain proportion of the dust discharged, the lighter grains particularly, is floated away. Where the areas to be dusted are wide, dust which floats away from the machine may well settle elsewhere and not be lost but where the areas to be dusted are relatively small there may be a considerable loss of dust due to air currents and furthermore the dust may be blown into houses and into localities where it is breathed into the lungs of humans and animals, to their injury. Perhaps the greatest difficulty of this kind arises in connection with the use of machines primarily designed for the control of lawn pests such for instance as chinch bugs which infest the lawns of city and suburban homes and seriously menace golf courses. It is highly undesirable, as will be obvious, to employ dusting apparatus which will liberate substantial bodies of dust to pass off of the property upon which the dusting apparatus is located and onto other properties. Not only is there the health hazard but likewise a loss of efficiency of the dusting operation and an increased cost, where this occurs.

A primary object of the present invention is to provide a dusting apparatus or machine, and a dusting method, whereby insecticide dust may be freely and rapidly applied to vegetation to be treated, with complete absence of waste, means being provided in association with the dust projecting mechanism for preventing the escape of the lighter grains of air-borne dust which are not retained upon the object being dusted. The apparatus includes means for circulating a stream of air, which means includes a device for introducing dust into the flowing stream, a nozzle for projecting the dust-laden air stream onto the object to be dusted, and means for collecting the air thus discharged and returning it to the air circulating mechanism, together with any dust-laden particles which it may contain. The form of the apparatus which is disclosed by way of example embodies a nozzle for directing a dust-laden stream of air downwardly against a lawn surface or grass plot and a large capacity hood immediately adjacent the discharge nozzle for collecting the air thus discharged, with any burden of fine dust which may be suspended in it, and to return this dust-laden air to the mechanism employed for effecting circulation of the air. The mechanism described is mounted upon a mobile support so that it may be freely moved back and forth across a lawn, the nozzle preceding the dust-collecting hood, and as a result the lawn is effectively dusted without deliverance of dust into the atmosphere to any substantial extent.

Naturally the invention may have various embodiments and is applicable not only to mechanisms for dusting lawns and grass plots but also to mechanisms for dusting growing crops of all kinds, where dust recovery is desirable. Hence the design and arrangement of the various elements of the mechanism which are illustrated in the accompanying drawings may be substantially varied in adapting the invention to various uses, without departure therefrom.

In the drawings:

Figure 1 is a perspective view of a mobile lawn dusting apparatus of the type described above;

Figure 2 is a side elevation of the same on a larger scale, partially broken away to show certain of the otherwise concealed parts;

Figure 3 is a top plan view, also partially broken away; and

Figure 4 is a view showing a portion of the dust hopper, together with the dust feeding mechanism, air and dust mixing means, and fan.

Preferably the means for placing air under fan pressure and supplying dust to the air stream is substantially as described and claimed in Patent 1,716,970 previously referred to and this mechanism and its mode of operation need only be briefly described. The hopper which is to contain a substantial supply of dust to be directed by the machine against the vegetation to be dusted, is indicated generally at 10 in the drawings and the lower portion of this hopper, indicated at 11, houses a dust feeding mechanism by means of which dust is supplied to the dust and air mixing chamber 12, directly below the hopper portion 11. A fan member 13 is housed within a fan casing 14 which may be integral with or attached to the wall of the mixing chamber 12, as shown most clearly in Figure 4. The bottom plate or wall of the dust hopper is indicated at 14' and is provided with an aperture of relatively small size, the area of which can be regulated by means which it is not necessary to describe, and a feeding device generally indicated at F is supplied for effecting the movement of dust through the aperture in plate 14' into the mixing chamber 12 at a rate proportional to the speed of movement of the machine across the turf. This feeding device F is fixed upon a supporting shaft 15 the ends of which are rotatably supported in bearings formed integrally with the hopper 11, the device F comprising a hub 16 and four or more radially projecting arms 17 having fixed upon the ends thereof the reversely inclined wiping blades 18 which move over the cylindrically curved surface of the bottom plate 14' and effect the discharge of dust through the aperture formed therein at a rate which increases and decreases with the speed of movement of the machine. Thus, mounted upon the end of the shaft 15 is a pulley 20 having a V-shaped groove within which lies the V-belt 21. The V-belt extends forwardly and around a pulley 22 which rotates with the wheel and hence drives, through the V-belt 21, the shaft 15 at a speed which depends upon the speed of movement of the dusting apparatus as a whole across the lawn to be dusted. The frame 26 comprises diverging bars having apertures at their forward and lower ends through which the short rod 23 projects and having at their upper and rearward ends handles 28 to be grasped by the operator, bar encircling sleeves 29 intermediate the ends of the bars being attached to the dust hopper and in reality comprising supporting brackets by means of which the hopper is supported from the vehicle frame.

Extending horizontally through the mixing chamber 12, which chamber opens into the interior of the fan casing 14, is a shaft 30 the ends of which are rotatably supported in bearings, this shaft carrying a beater member 31 located within the mixing chamber 12 and likewise having fixed thereon the fan or blower 13. Shaft 30 is driven from the traction wheel 25 of the vehicle, through the V-belt 21, pulley 20, and shaft 15, but at a speed many times that of shaft 15 by reason of the interposition between these shafts of the driving and multiplying gearing indicated at 34, contained within the housing 35. Any suitable type of speed increasing driving means may be employed but the gearing shown, which includes the large gear 36 fixed on shaft 15, idler pinion 37 engaged thereby, large gear 38 operatively connected to and rotatable with pinion 37, and pinion 39 fixed on shaft 30, is eminently suitable, this gearing effecting rotation of shaft 30 at over 3,000 revolutions per minute when the vehicle is advanced over a lawn at a linear velocity of around four miles per hour.

Air passages to the mixing chamber as indicated by the arrows in Figure 3, through apertures 42 disposed laterally of the bearing 43 which supports one end of shaft 30, into the mixing chamber, then to the fan. The air is delivered by the fan under light pressure to the tangential fan offtake 44. In its passage through the mixing chamber the air stream picks up dust dropped into this chamber from the hopper above, which dust is immediately floated and disbursed evenly throughout the chamber by the action of the beater arms 31 revolving at high velocity and the air floated dust then passes into the fan and out through the discharge offtake 44, as aforesaid. Attached to the end of the fan offtake 44 is a distributor member 46 to which in turn are connected four flexible tubular members 47 by means of which the dust-laden air is conducted downwardly to one or more discharge nozzles 48, the walls of the discharge nozzle or nozzles converging downwardly as shown in Figure 2 and the nozzle terminating in an elongated narrow port or a series of aligned elongated narrow discharge ports, depending upon whether it is desired that the four tubes 47 discharge into a single chamber or each into a separate chamber. In any event, the nozzle discharge port is relatively long, in the average case between two and three feet, so that a strip of turf of substantial width will be dusted as the machine is advanced. Associated with this discharge nozzle 48 is a hood 50 which is semi-cylindrical as shown, in vertical section, taken longitudinally of the vehicle, the ends being closed by vertical plates such as indicated at 51 in Figure 1. The hood is suspended by means of rods 54 the lower ends of which are permanently connected to the hood at or adjacent its corners and the upper ends of which are adjustably connected at spaced points to the respective bars of the frame of the vehicle. The downwardly opening hood may thus be supported at any desired elevation with respect to the frame of the vehicle, for the convenience of the operator. The hood is of very substantial size and thus may serve as an expansion chamber, having ample capacity to collect the air, discharged by the nozzle or nozzles 48, and any dust carried by such air. At the top of the hood there is formed an aperture indicated at 56 which is in registry with the interior of the transversely extending collection chamber 57 of the hood. Chamber 57 is provided with an outlet aperture 58 which is connected to the inlet 42 of the mixing chamber by the tubular conduit which includes the horizontally extending tube 60, to which the laterally projecting conduit 61 is rigidly connected, the outer end of conduit 61 being in turn connected to short tube 63 which discharges into the casing 64 secured to the wall of the mixing chamber 12 in such position as to envelop or encircle the apertures 42. Under the action of the fan 13 air is drawn from the hood 50 to the mixing chamber through the conduits just referred to, as indicated by the arrows in Figures 2 and 3, and to permit adjustment of the hood 50 with respect to the frame of the vehicle, the end of tubular member 60 has a swivel connection to the wall of the collection chamber 57, and the outer end of the lateral duct 61 has a swivel connection to the tubular member 63, as shown in Figure 2.

An upwardly and forwardly curved projecting member 65 serves as a guard to contact with any stationary object which the apparatus may encounter and to lift the hood upwardly over such object. There is attached to the lower margin of the hood, as by means of rivets 66, a fabric apron 67 which depends for a substantial distance below the hood and is intended to serve as a means for preventing escape of dust-laden air into the outside atmosphere, so far as this is possible. It will be observed that the apron is attached to the sides and rear of hood 50 but that its forward portion, that is the portion which is immediately in rear of the wheel shown and which extends transversely of the hood, is attached to a bracket member 50' secured to the nozzle 48. Thus the leading portion of the apron is well in advance of the nozzle and no portion of it can be deflected rearwardly so far that the mouth of the nozzle can be obstructed thereby. As a matter of fact, the apron forms an effective guard against the escape of dust and causes the dust-laden air to be confined so that it rises into the expansion chamber or hood 50 from the top of which it is drawn back to the mixing chamber to receive an additional supply of dust, thence passes to the fan, and finally to the nozzle members 48.

The machine disclosed, therefore, may be said to comprise means for circulating air through a substantially closed circuit, which means includes a nozzle for increasing the velocity of dust-laden air and projecting it against an object to be dusted, an air and dust collecting chamber closely associated with the nozzle, a fan, or other device for causing air circulation, and means for introducing fresh dust into the circulating air stream. Minor quantities of air may pass actually under the apron 67 and be replaced by air passing inwardly under this apron but for the most part the air passing downwardly from the nozzle 48 will be collected in the expansion chamber or hood 50 and be recirculated. The light dust which is not retained by the turf, however, cannot escape in any appreciable quantity but will be retained by the apparatus and recirculated so that eventually it will be driven against the vegetation being dusted in such manner as to be retained.

As has been previously explained, the invention may be embodied in various types of dusting apparatus, of which the one which has been described in detail is only an example.

It will probably be found to be of greatest utility when the dust which is to be distributed is of the type which generates or gives off objectionable gases or fumes, especially when it is being handled. The hood and return means for the floating dust likewise serves to recirculate any objectionable gas which may be given off by the dust instead of permitting its free discharge into the atmosphere, so that the health of the operator is not threatened by the presence of either gas or dust in the atmosphere adjacent the machine.

Having thus described the invention, what is claimed as new and desired to be secured by Letters Patent is:

In a dusting machine, in combination, a mobile support, a downwardly opening hood mounted in said support, the ceiling of said hood having a forward horizontal portion and a rear portion arched upwardly and rearwardly from the rear edge of said forward portion so as to place the uppermost part thereof a substantial distance above said forward horizontal portion, said hood also having substantially vertical end closure members, means in said forward portion and adjacent said rear portion thereof for projecting a stream of dust-laden air against the ground as the machine is advanced, the air thus projected being collected in the hood, together with the dust not deposited, a fan, a conduit, of relatively small cross sectional area as compared to the largest horizontal cross sectional area of said arched portion, connected to the uppermost arched portion of the hood and to the fan intake, a conduit connecting the outlet of the fan to the air and dust projecting means, and a device anterior to the air and dust projecting means for introducing fresh dust into the moving air stream.

GEORGE S. MESSINGER.
CLYDE U. MESSINGER.